United States Patent
Iio et al.

(10) Patent No.: US 6,930,623 B2
(45) Date of Patent: Aug. 16, 2005

(54) OPTICAL SIGNAL PROCESSING SYSTEM

(75) Inventors: Shinji Iio, Musashino (JP); Masayuki Suehiro, Musashino (JP); Shin-ichi Nakajima, Musashino (JP); Yoshiyuki Asano, Musashino (JP); Hiroyuki Matsuura, Musashino (JP); Akira Miura, Musashino (JP); Tsuyoshi Yakihara, Musashino (JP); Shinji Kobayashi, Musashino (JP); Sadaharu Oka, Musashino (JP); Hirotoshi Kodaka, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 0 days.

(21) Appl. No.: 10/761,372

(22) Filed: Jan. 22, 2004

(65) Prior Publication Data

US 2004/0178935 A1 Sep. 16, 2004

(30) Foreign Application Priority Data

Mar. 11, 2003 (JP) ..................................... 2003-064657

(51) Int. Cl.$^7$ ............................................... H03M 9/00
(52) U.S. Cl. ....................... 341/100; 341/101; 341/137
(58) Field of Search ................................ 341/100, 101, 341/141, 137

(56) References Cited

U.S. PATENT DOCUMENTS

| | | | |
|---|---|---|---|
| 5,010,346 A | * 4/1991 | Hamilton et al. | ........... 341/137 |
| 5,189,541 A | * 2/1993 | Konishi | ........................ 398/59 |
| 5,726,990 A | * 3/1998 | Shimada et al. | ............. 370/536 |
| 5,808,571 A | * 9/1998 | Kuwata et al. | .............. 341/100 |
| 6,121,907 A | * 9/2000 | Fields et al. | ................. 341/137 |
| 6,177,891 B1 | * 1/2001 | Nakamura | ................... 341/100 |
| 6,184,808 B1 | * 2/2001 | Nakamura | ..................... 341/95 |
| 6,696,995 B1 | * 2/2004 | Foley et al. | ................. 341/100 |

FOREIGN PATENT DOCUMENTS

JP          8-181667          7/1996

OTHER PUBLICATIONS

"Ultra High–speed Optical Switching Technology" co–edited by Takeshi Kamiya and Yasuhiko Arakawa, the first edition, Baifukan Co., Ltd., Jul. 1993.

* cited by examiner

Primary Examiner—Peguy JeanPierre
(74) Attorney, Agent, or Firm—Westerman, Hattori, Daniels & Adrian, LLP (57) ABSTRACT

The present invention aims at achieving an optical signal processing system which converts a higher speed optical signal to electrical signals by time-demultiplexing the signal with low-speed electrical signals.

The present invention offers an improved optical signal processing system that converts a serial pulse train optical signal with transmission speed N to parallel pulse train electrical signals. This system is characterized by providing a serial-parallel converter in which at least two optical switches are cascaded, each of which outputs optical signals with transmission speed M (N>M) to one of the two output terminals and outputs the remaining optical signals to the alternative one of said two output terminals by switching connection to said output terminal, receiving parts which convert optical signals from one of the two output terminals of each of the above optical switches to electrical signals, a synchronizing circuit which outputs timing signals in synchronization with electrical signals output from these receiving parts, and drivers which cause the above described optical switches to switch their connections based on timing signals output from the above synchronizing circuit.

8 Claims, 6 Drawing Sheets

FIG.6a Optical TDM signal in synchronization with switching of optical switch connection FIG.6b Optical TDM signal out of synchronization with switching of optical switch connection

OPTICAL SIGNAL PROCESSING SYSTEM

BACKGROUND OF THE INVENTION

1. Field of the Invention

The present invention relates to an optical signal processing system which converts a serial pulse train optical signal with transmission speed N to parallel pulse train electrical signals, and in particular to an optical signal processing system which converts a high-speed optical time-division multiplexing signal to electrical signals. The present invention is related in detail to an optical signal processing system which converts a high-speed optical signal to electrical signals by performing time-demultiplexing of the high-speed optical signal using a low-speed electrical signal.

2. Description of the Prior Art

Popularization of information communicating networks including the Internet has increased the amount of data to be transmitted, and in recent years, further increase of transmission capacity has been being required in optical communications. In order to increase the transmission capacity, both the time division multiplexing (hereafter abbreviated as TDM) system that multiplexes multi-channel optical signals to a time-serial optical signal and the wavelength division multiplexing (hereafter abbreviated as WDM) system that multiplexes channels through light of different wavelengths are employed. Specifically, an increase of transmission capacity is intended by decreasing the distance between wavelengths of channels transmitted through a transmission line using the WDM system and by increasing the transmission speed (bit rate) per time interval in each channel using the TDM system.

Figure 1:
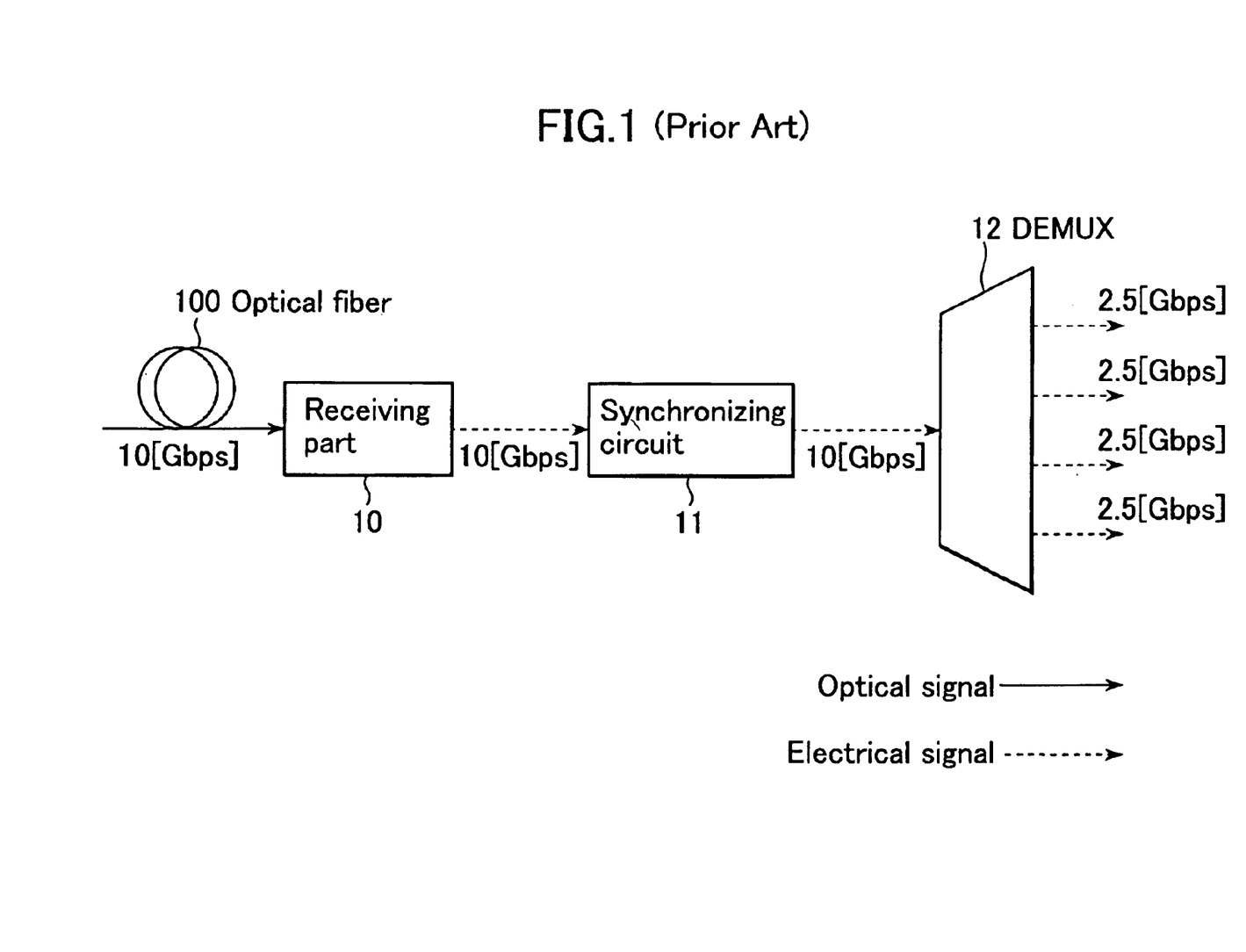
FIG. 1 is a drawing showing a first configuration of conventional optical signal processing systems.

FIG. 1 is a configuration drawing of a conventional optical signal processing system that demultiplexes an optical time-division multiplexing signal (hereafter abbreviated as optical TDM signal) to electrical signals before multiplexing (e.g., refer to patent document 1: Gazette containing Japanese Laid-open Patent Application No. 8-181667 (paragraph numbers 0002 to 0004, FIG. 16)). In FIG. 1, optical fiber 100 transmits an optical TDM signal. Receiving part 10 consists of, for example, a high-speed PIN photodiode, whose input section is connected to optical fiber 100. The input section of synchronizing circuit 11 is connected to the output section of receiving part 10. The input section of electrical demultiplexing (hereafter abbreviated as DEMUX) circuit 12 is connected to the output section of synchronizing circuit 11.

The operation of such a system will be described below.

A WDM signal transmitted through a transmission line for optical communication is divided into each channel by an optical demultiplexer not shown in the drawing. An optical TDM signal for one channel of the WDM signal is transmitted through optical fiber 100 and is input to receiving part 10. For example, if it is assumed that the optical TDM signal is an optical TDM signal of 10 Gbps in which four optical signals of 2.5 Gbps each are subjected to time-division multiplexing, receiving part 10 receives the optical TDM signal of 10 Gbps, converts this signal to an electrical time-division multiplexing signal (hereafter abbreviated as electrical TDM signal), and then outputs it to synchronizing circuit 11.

Synchronizing circuit 11 extracts the clock signal from the electrical TDM signal and outputs the electrical TDM signal and clock signal to DEMUX circuit 12. DEMUX circuit 12 performs time-demultiplexing of the electrical TDM signal to return it to four electrical signals of a lower transmission speed of 2.5 Gbps and outputs them to a data processing part at a later stage not shown in the drawing.

Figure 2:
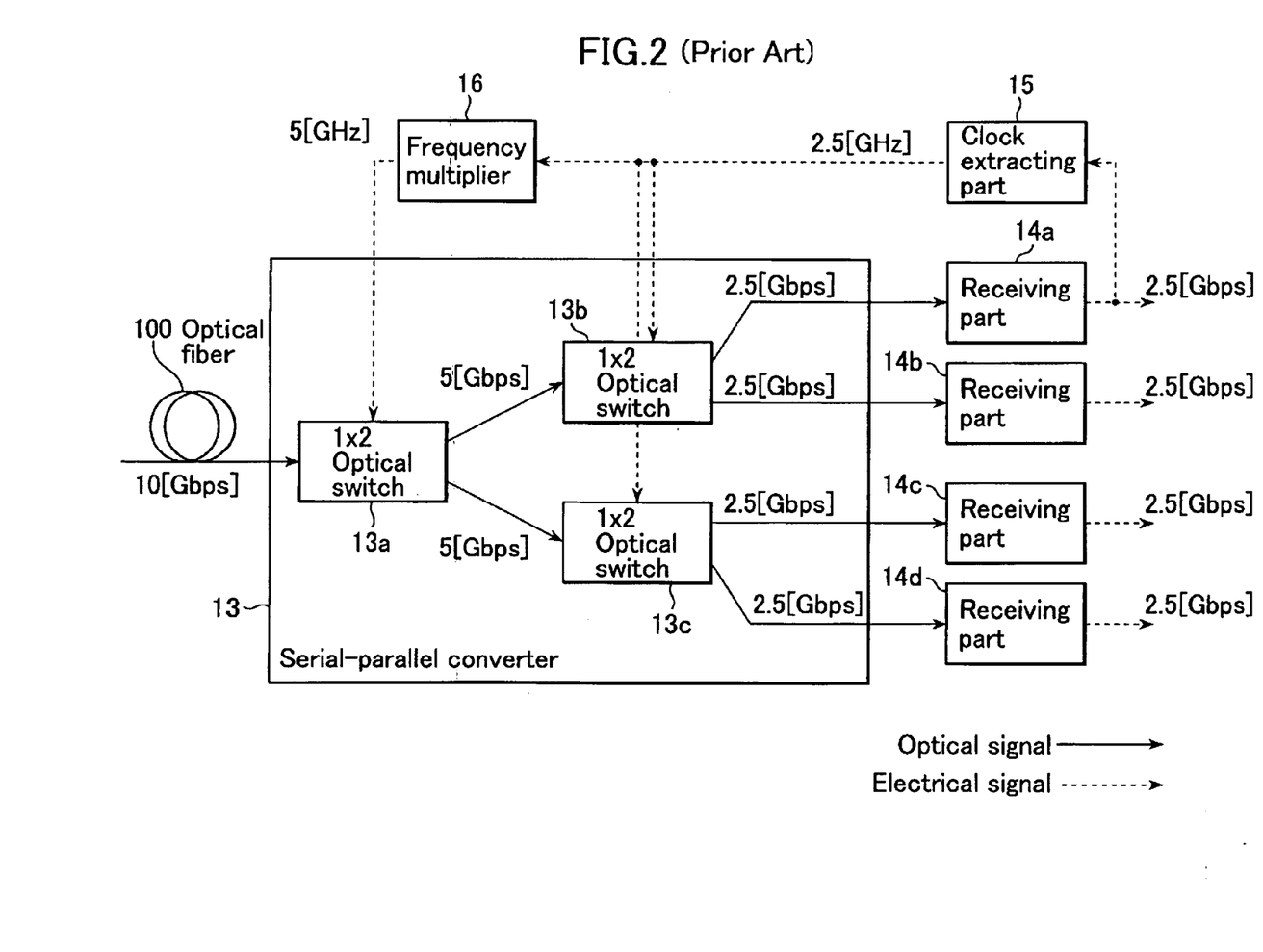
FIG. 2 is a drawing showing a second configuration of conventional optical signal processing systems.

FIG. 2 is a configuration drawing for another conventional example (e.g., refer to non-patent literature 1: "Ultra High-speed Optical Switching Technology" co-edited by Takeshi Kamiya and Yasuhiko Arakawa, the first edition, Baifukan Co., Ltd., July 1993). Here, the items equivalent to those shown in FIG. 1 are given the same signs and description for them will be omitted. In FIG. 2, serial-parallel converter 13 comprises optical switches, each having one-input and two-output terminals (hereafter abbreviated as 1×2 optical switches or simply optical switches), 13a, 13b, and 13c and the input section of serial-parallel converter 13 is connected to optical fiber 100. The input terminal of optical switch 13a is connected to optical fiber 100. The input terminal of optical switch 13b is connected to one of the two output terminals of optical switch 13a. The input terminal of optical switch 13c is connected to the alternative output terminal of optical switch 13a.

The input terminals of receiving parts 14a to 14d are in turn connected to one of two output terminals of optical switch 13b, the alternative output terminal of optical switch 13b, one of two output terminals of optical stitch 13c, and the alternative output terminal of optical switch 13c respectively. The input section of clock extracting part 15 is connected to the output section of receiving part 14a and the output section of clock extracting part 15 is connected to both optical switches 13b and 13c. The input section of frequency multiplier 16 is connected to the output section of clock extracting part 15 and the output section of frequency multiplier 16 is connected to optical switch 13a.

The operation of such a system is described below.

A 10 Gbps optical TDM signal, in which four optical signals of 2.5 Gbps each are time-division multiplexed, is input to optical switch 13a of serial-parallel converter 13 through optical fiber 100. Optical switch 13a performs time-demultiplexing of the optical signal by switching the connection to its output terminals at a speed of 5 GHz (½ the transmission speed of the optical TDM signal) and outputs optical TDM signals of 5 Gbps, this speed being lower than the speed of the input optical TDM signal, to optical switches 13b and 13c.

Further, each of optical switches 13b and 13c performs time-demultiplexing by switching the connection to their output terminals at a speed of 2.5 GHz and outputs optical signals of 2.5 Gbps each to receiving parts 14a to 14d. That is, serial-parallel converter 13 performs time-demultiplexing of the 10 Gbps time-serial optical TDM signal, obtains four 2.5 Gbps parallel optical signals, and outputs them to receiving parts 14a to 14d respectively. Finally, each of receiving parts 14a to 14d converts an optical signal to an electrical signal.

Now, the operation of the switching control of optical switches 13a to 13c will be described. Clock extracting part 15 extracts a clock signal of 2.5 GHz, the phase of which is synchronized with the 2.5 Gbps electrical signal from receiving part 14a, from this electrical signal. Using this clock signal, connections of optical switches 13b and 13c are switched. In addition, frequency multiplier 16 (used as a frequency doubler in this case) changes the frequency of the clock signal to 5 GHz, twice the original frequency, and the connection of optical switch 13a is switched using this frequency.

Although the transmission speed of the optical TDM signal currently activated is 10 Gbps or so, increasing the transmission speed is desirable to expand the transmission capacity and research and development for speeds of 40 Gbps, 80 Gbps and 160 Gbps is underway.

However, the system shown in FIG. 1, has a problem in that it is difficult for receiving part 10 which converts an optical signal to electrical signals, synchronizing circuit 11 which handles electrical signals, and DEMUX circuit 12 to respond to speeds equal to or higher than 40 Gbps, and especially difficult to synchronize circuit 11 and DEMUX circuit 12 which handle electrical signals, to respond to such speeds.

On the other hand, for the system shown in FIG. 2, receiving parts 14a to 14d and clock extracting part 15 are enough to be capable of processing only such optical signals and electrical signals as thier transmission speeds are reduced to ¼ by serial-parallel converter 13. However, another problem exists wherein frequency multiplier 16 which controls the first stage optical switch 13a is required to process higher speed electrical signals thereby making it difficult for it to respond to speeds equal to or higher than 40 Gbps.

SUMMARY OF THE INVENTION

The objective of the present invention is to achieve an optical signal processing system that performs time-demultiplexing of a higher speed optical signal using a lower speed electrical signal and converts this optical signal to electrical signals.

DETAILED DESCRIPTION OF THE PREFERRED EMBODIMENTS

Embodiments of the present invention will be described below using drawings.

[First Embodiment]

Figure 3:
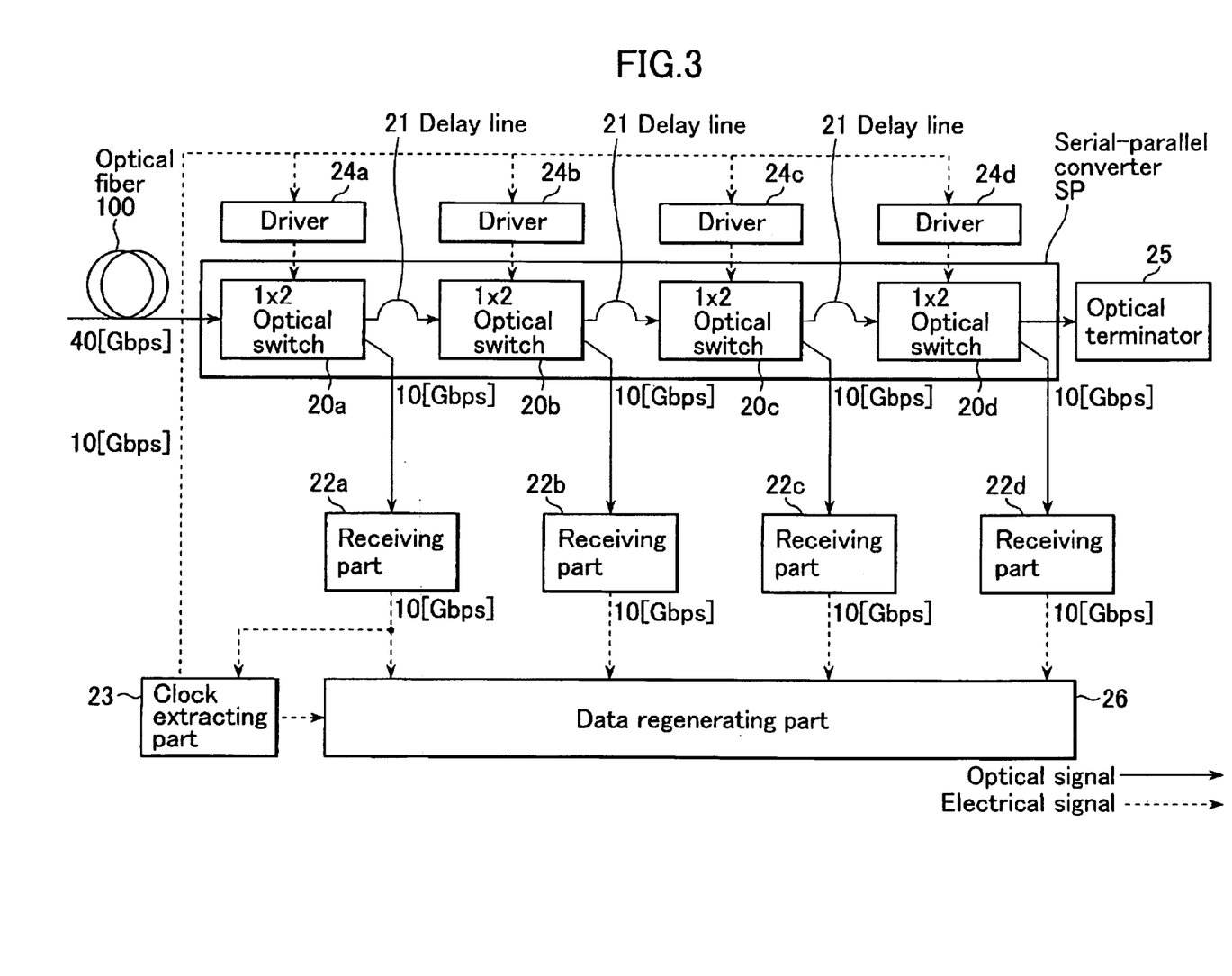
FIG. 3 is a configuration drawing indicating a first embodiment of the present invention.

FIG. 3 is a configuration drawing indicating a first embodiment of the present invention. Items equivalent to those shown in FIG. 1 and FIG. 2 are given the same signs and description for them will be omitted. In FIG. 3, serial-parallel converter SP comprises cascaded 1×2 optical switches 20a to 20d and its input section is connected to optical fiber 100.

These optical switches 20a to 20d can be high-speed optical switches such as electro-optic effect type optical switches using a dielectric optical waveguide or carrier injection type optical switches using a semiconductor optical waveguide (this type of switch employs a system where carriers are injected into a semiconductor and switch connection is switched by changing the refractive index of that semiconductor by passing a current through this injected region: (e.g., see Baojun Li, Soo-Jin Chua, "2×2 Optical Waveguide Switch with Bow-Tie Electrode Based on Carrier-Injection Total Internal Reflection in Si—Ge Alloy," IEEE Photonics Technology Letters, IEEE, March 2001, Vol. 13, No. 3, pp206–208). These switches can switch paths at a higher speed in comparison to mechanical optical switches and Micro Electro Mechanical System (MEMS) optical switches.

For optical paths interconnecting optical switches 20a to 20d, optical signals are transmitted through delay lines 21. It is better to form optical switches 20a to 20d and delay lines 21 on a single waveguide. Delay line 21 delays an optical TDM signal from optical fiber 100 by 1 bit of the pulse train. In other words, the delay line delays the optical TDM signal by the interval equivalent to its one period (cycle). For example, if the transmission speed of the optical TDM signal is 40 Gbps, the signal is transmitted delayed by 25 ps in turn between each sequential two optical switches from 20a to 20d. The length of delay line 21 is calculated to be about 2 to 3 mm if the refractive index of the optical waveguide is about 3.4, using the equation of 25 ps×(speed of light)/(refractive index).

The input terminal of first stage optical switch 20a is connected to optical fiber 100. One of two output terminals (hereafter called one output terminal) of each of these optical switches 20a to 20d is respectively connected to each input section of receiving parts 22a to 22d, each of which is provided corresponding to each of optical switches 20a to 20d. The input terminal of each of second, third and final stage optical switches 20b to 20d is connected to the corresponding alternative of each pair of output terminals (hereafter called the alternative output terminal) of each of optical switches 20a to 20c respectively, that is, each pre-stage of optical switches 20b to 20d.

Receiving parts 22a to 22d consist of high-speed PIN photo-diodes, for example. Clock extracting part 23 is a synchronizing circuit and its input section is connected to the output section of receiving part 22a. Drivers 24a to 24d are provided corresponding respectively on a one-to-one basis to optical switches 20a to 20d, and each of the input sections of drivers 24a to 24d is connected to the output section of clock extracting part 23. Each of the output sections of drivers 24a to 24d is electrically connected to each corresponding optical switch 20a to 20d.

The input section of optical terminator 25 is connected to the alternative output terminal of the last stage optical switch 20d and terminator 25 carries out termination processing of the input optical signal. The input section of data regenerating part 26 is connected to the output sections of receiving parts 22a to 22d and clock extracting part 23.

Figure 4:
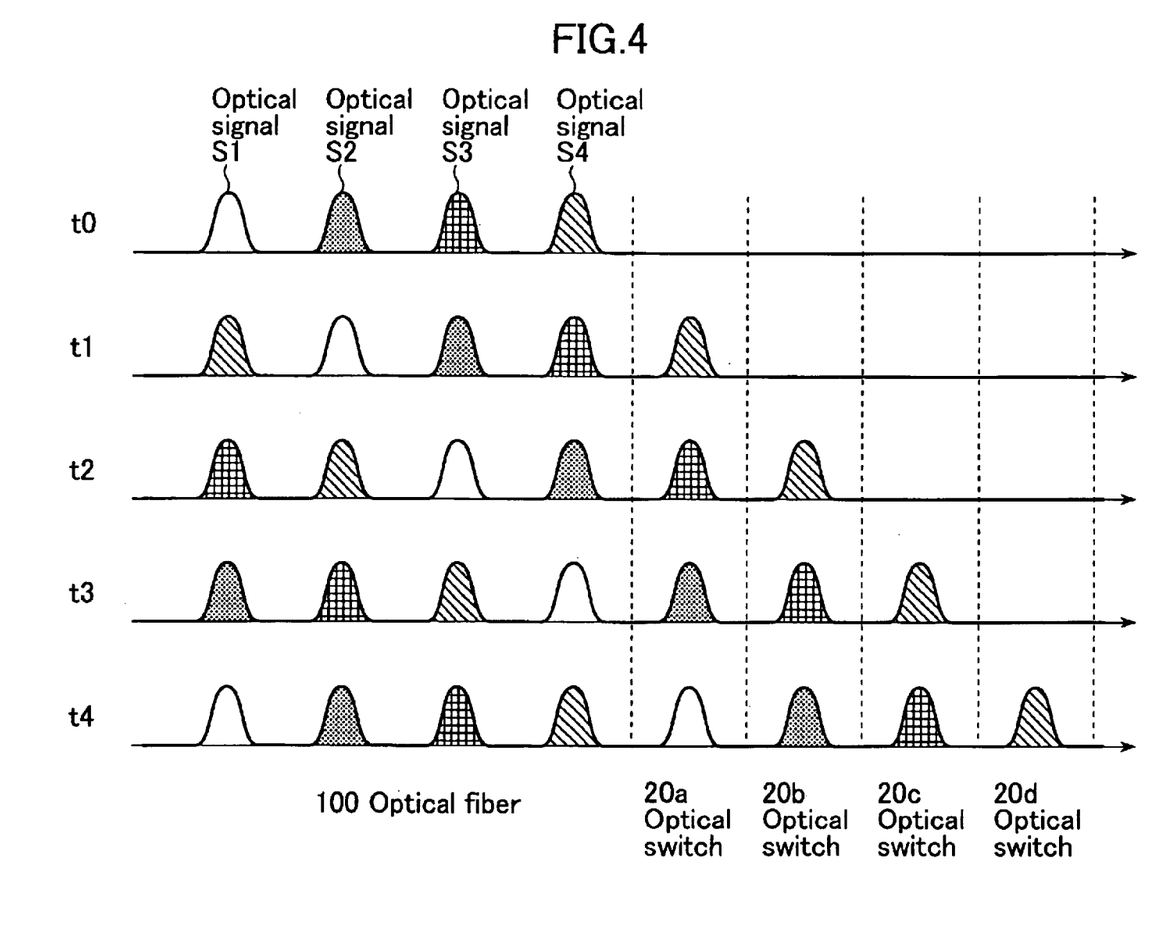
FIG. 4 is a timing chart indicating the operation of optical switches 20a to 20d.

The operation of such a system will be described below. FIG. 4 is a timing chart illustrating the operation of optical switches 20a to 20d and shows positions in which optical signals exist in optical fiber 100 and optical switches 20a to 20d at every instant.

First, drivers 24a to 24d cause optical switches 20a to 20d to connect the input terminal of each of these optical switches to the alternative output terminal of each of these optical switches respectively. Now, at instant t0, a serial pulse-train optical TDM signal of 40 Gbps, in which four optical signals S1 to S4, each of 10 Gbps, are time-division multiplexed, is transmitted through optical fiber 100. At instant t1, a pulse of the front optical signal S4 of the optical TDM signal is input to optical switch 20a located in serial-parallel converter SP. Further at instant t2, being delayed by the interval equivalent to one period (25 ps) of the optical TDM signal from instant t1, optical signal S3 is input to optical switch 20a and optical signal S4 is input to optical switch 20b.

Then, at instant t3, being delayed by the interval equivalent to one period of the optical TDM signal from instant t2, optical signal S2 is input to optical switch 20a, optical signal S3 to optical switch 20b, and optical signal S4 to optical switch 20c. Further, at instant t4, being delayed by the interval equivalent to one period of the optical TDM signal from instant t3, optical signal S1 is input to optical switch 20a, optical signal S2 to optical switch 20b, optical signal S3 to optical switch 20c, and optical signal S4 to optical switch 20d. At this instant t4, drivers 24a to 24d cause optical switches 20a to 20d to be switched to optical paths leading to receiving parts 22a to 22d by connecting the input terminal of each of these optical switches to one output terminal of each of these optical switches to output 10 Gbps optical signals of S1 to S4 to receiving parts 22a to 22d.

In other words, serial-parallel converter SP performs time-demultiplexing of a 40 Gbps optical TDM signal in which optical signals S1 to S4 are multiplexed time-serially to obtain optical signals S1 to S4 at lower transmission speeds of 10 Gbps each, dropped to ¼ of the original 40 Gbps, this denominator being equal to the number of cascaded optical switches 20a to 20d, and outputs four parallel pulse-train optical signals S1 to S4 to receiving parts 22a to 22d. Each of receiving parts 22a to 22d converts optical signals S1 to S4 to parallel pulse-train electrical signals.

Receiving parts 22a to 22d, after converting the 10 Gbps optical signals S1 to S4 to electrical signals, output these electrical signals to data regenerating part 26. Data regenerating part 26 changes at least either the modulation scheme or the pulse width of the electrical signal. For example, one or more actions as shown below are performed. (1) Non Return Zero (NRZ) modulation is converted to Return Zero (RZ) modulation. (2) Since the pulse width is a narrow width matched with 40 Gbps, the pulse width is extended four times. (3) Since pulse intervals may sometimes be shifted due to mechanical strain and/or temperature change during the transmission of the optical signal through optical fiber 100, this shift is corrected. (4) Wave shapes that have been subjected to rounding are reshaped.

In addition, the time duration in which drivers 24a to 24d cause optical switches 20a to 20d to connect the input terminal of each of these switches to one output terminal of the respective switch is equal to or less than the interval equivalent to one period (25 ps) of the optical TDM signal. If this time duration has passed, the drivers cause the optical switches to connect the input terminal of each of these switches to the alternative output terminal of the respective switch. Of course, subsequent to instant t4, operations at instants t1 to t4 are repeated in the same manner, and at every instant of t4 the drivers cause the optical switches to connect the input terminal of each of these switches to one output terminal of the respective switch.

Further, remainders of optical signals S1 to S4 which are not output to receiving parts 22a to 22d (for example, including the output of optical signals S1 to S4 to the alternative output terminal of each of optical switches 20a to 20d due to the switch connection switching time and/or the output of optical signals S1 to S4 to the alternative output terminal of each of optical switches 20a to 20d due to cross-talks between these optical switches) are input to optical terminator 25 provided at the stage after the last stage optical switch 20d. Optical terminator 25 carries out termination processing which prevents remainders of optical signals S1 to S4 from returning to serial-parallel converter SP again.

Now, the operation of controlling switching of optical switches 20a to 20d will be described. From the 10 Gbps electrical signals output from receiving part 22a, clock extracting part 23 extracts 10 GHz clock signals the phase of which is synchronized with the above electrical signals. Clock extracting part 23 outputs these clock signals as timing signals to drivers 24a to 24d with the interval equivalent to 10 GHz period (instant t4 in FIG. 4). When a clock signal is input from clock extracting part 23, drivers 24a to 24d switch the connection of optical switches 20a to 20d to one output terminal of each of the respective switches for the predetermined time interval.

As described above, an optical TDM signal with a 40 Gbps transmission speed is subjected to time-demultiplexing to obtain the optical signals S1 to S4 each with a 10 Gbps transmission speed which is reduced from the 40 Gbps transmission speed by dividing it by the number of cascaded optical switches (or multiplied by ¼). These 10 Gbps optical signals S1 to S4 are converted to electrical signals by receiving parts 22a to 22d. In addition, clock extracting part 23 and drivers 24a to 24d operate in synchronization with the 10 Gbps electrical signals output from receiving part 22a. This enables lower-speed electrical signals to perform time-demultiplexing of a higher-speed optical signal and to convert the optical signal to electrical signals.

Furthermore, since optical switch 20d at the last stage outputs remainders of optical signals S1 to S4 to optical terminator 25, the S/N ratio of optical signal S4 detected by receiving part 22d can be increased.

Further, since optical signals S1 to S4 are simultaneously input to each of optical switches 20a to 20d by delay lines 21, clock signals to drivers 24a to 24d can be output at the same time. This facilitates adjustment of the timing that switches connection of optical switches 20a to 20d.

[Second Embodiment]

Figure 5:
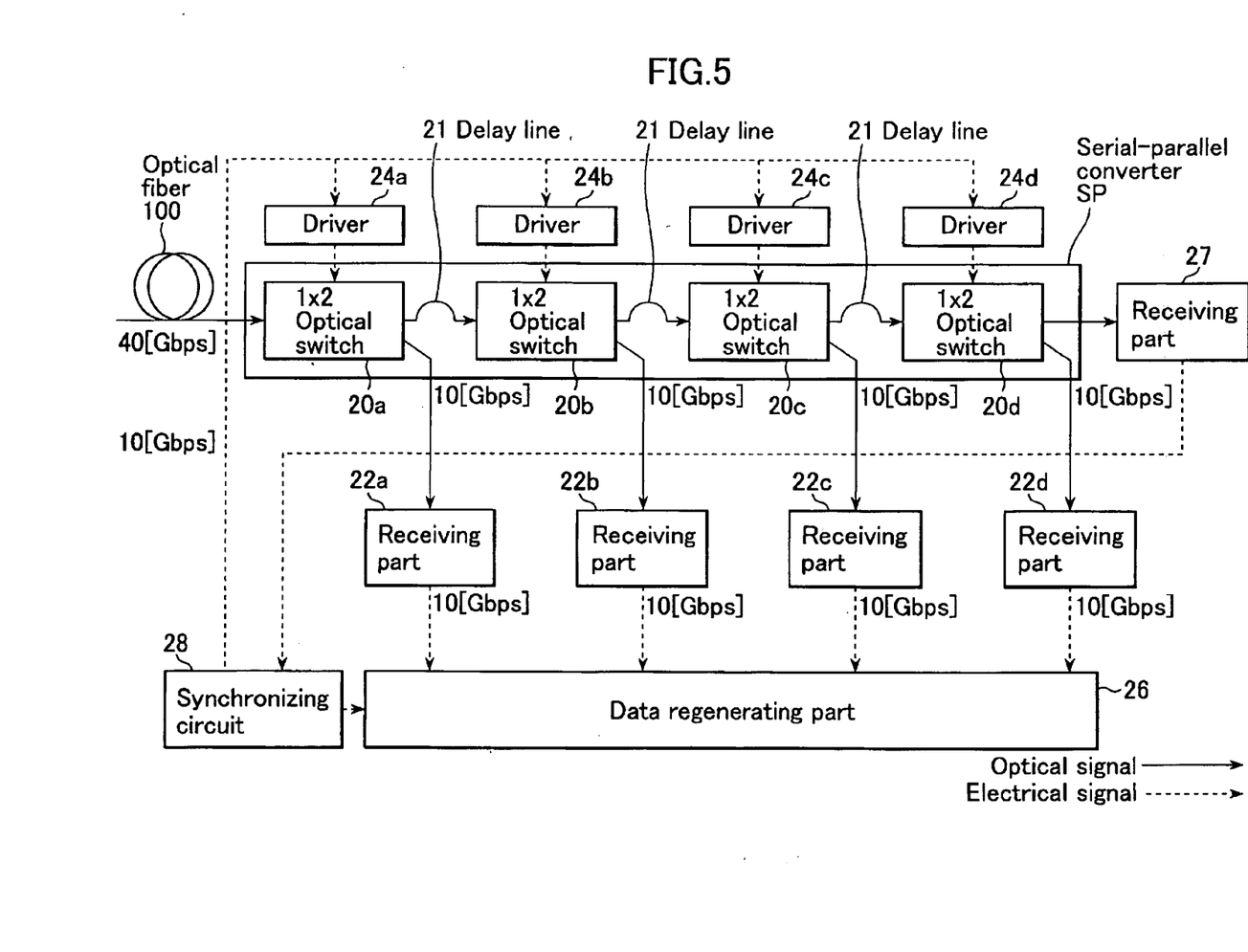
FIG. 5 is a configuration drawing indicating a second embodiment of the present invention.

FIG. 5 is a configuration drawing indicating a second embodiment of the present invention. Here, items equivalent to those shown in FIG. 3 are given the same signs and description for them will be omitted. In FIG. 3, second receiving part 27 is provided in lieu of optical terminator 25 and the input section of this receiving part is connected to the alternative output terminal of the last stage optical switch 20d. In addition, synchronizing circuit 28 is provided, whose input section is connected to the output section of receiving part 27 and whose output section is connected to the input sections of drivers 24a to 24d and to the input section of data regenerating part 26, in lieu of clock extracting circuit 23.

The operations of such a system will be described.

Receiving part 27 receives optical signals output from the alternative output terminal of the last stage optical switch 20d in serial-parallel converter SP. This part 27 integrates the optical power of optical signals during a time interval equivalent to at least the periods whose number is the same as that of optical switches 20a to 20d provided in serial-parallel converter SP, that is, during four periods of the optical signal, and outputs a voltage proportional to the optical power to synchronizing circuit 28. Synchronizing circuit 28 compares the value of voltages output in turn from receiving part 27 and outputs timing signals to drivers 24a to 24d to minimize the value of electrical signals from receiving part 27.

Figure 6A:
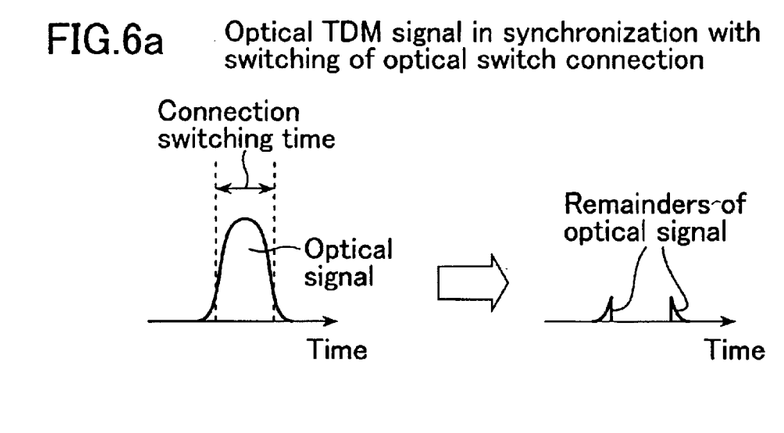
FIG. 6 is a drawing schematically showing the relationships between phases of an optical TDM signal and the switching of connections between optical switches 20a to 20d.
Figure 6B:
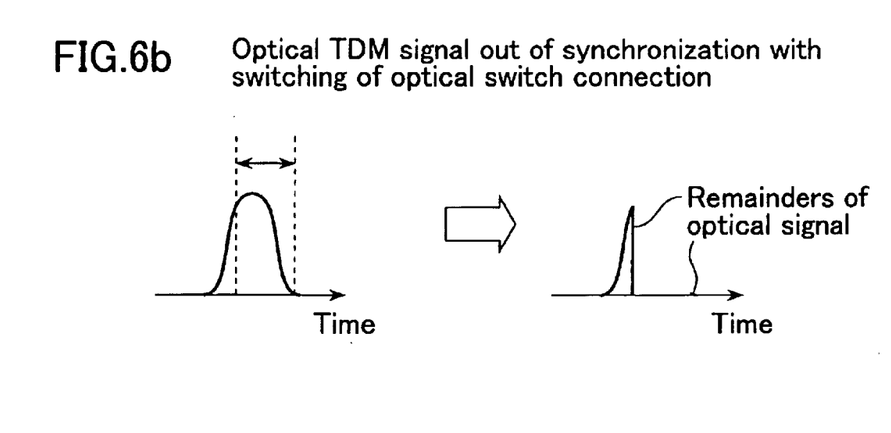

These are described in detail in FIG. 6. FIG. 6 is a drawing schematically showing the relationships between phases of an optical TDM signal and the switching of the connections of optical switches 20a to 20d. FIG. 6(a) shows a case where the phase of an optical TDM signal is in synchronization with the switching of the connections of optical switches 20a to 20d, and FIG. 6(b) shows a case where the phase of an optical signal is out of synchronization with the switching of the connections of optical switches 20a to 20d.

If optical signals S1 to S4 of the optical TDM signal are in synchronization with the switching of the connections of optical switches 20a to 20d (the connection of each input terminal to the respective alternative output terminal), there are almost no remainders of optical signals S1 to S4 output from one of each pair of output terminals of optical switches 20a to 20d. However, if both of the above are out of synchronization with each other, the remainders of optical signals increase. That is, voltage values output from receiving part 27 become high in statuses being out of synchronization. Synchronizing circuit 28 outputs timing signals to drivers 24a to 24d and data regenerating part 26 at timing instants that minimize the remainders of optical signals by monitoring voltage values output from receiving part 27.

Since operations other than these, wherein synchronizing circuit 28 such as above adjusts the timing for timing signals using voltage values from receiving part 27 and outputs the timing signals to driver 24a to 24d and data regenerating part 26 are similar to the operations of systems shown in FIG. 3, description of such operations will be omitted.

As described above, an optical TDM signal with a transmission speed of 40 Gbps is subjected to time-demultiplexing to obtain optical signals S1 to S4 each with a transmission speed of 10 Gbps which is reduced from the 40 Gbps transmission speed by dividing it by the number of cascaded optical switches 20a to 20d (or multiplied by ¼). Then receiving part 27 integrates the optical power of optical signals during a time interval equivalent to the periods whose number is the same as that of optical switches 20a to 20d provided in serial-parallel converter SP, and outputs voltages proportional to the integrated optical power to synchronizing circuit 28. Synchronizing circuit 28 and drivers 24a to 24d operate in synchronization with electrical signals from this receiving part 27. This enables lower-speed electrical signals to perform time-demultiplexing of a higher-speed optical signal and to convert the higher-speed optical signal to electrical signals.

In addition, the present invention is not restricted to the above embodiments but the following embodiments can also be included:

(1) In the systems shown in FIG. 3 and FIG. 5, configurations in which data regenerating part 26 regenerates electrical signal data from receiving parts 22a to 22d based on timing signals from clock extracting part 23 or synchronizing circuit 28 are shown. However, a configuration in which electrical signals are output from receiving parts 22a to 22d without providing data regenerating part 26, and with timing signals output from clock extracting part 23 or synchronizing circuit 28 can also be employed. For example, in the case where a 40 Gbps optical TDM signal in which sixteen 2.5 Gbps optical signals are multiplexed, a configuration may be adopted in which 10 Gbps electrical TDM signals output from receiving parts 22a to 22d are demultiplexed to 2.5 Gbps electrical signals using conventional DEMUX circuit 12 shown in FIG. 1.

(2) In the systems shown in FIG. 3 and FIG. 5, although a configuration in which delay lines 21 are provided is shown, optical switches 20a to 20d may be connected with optical waveguides or optical fibers having optical paths of desired lengths. In this case, it is a good practice for clock extracting part 23 or synchronizing circuit 28 to shift timings of timing signals to be output to drivers 24a to 24d or to provide delay circuits to each of drivers 24a to 24d to adjust timings for optical signals S1 to S4.

(3) In the systems shown in FIG. 3 and FIG. 5, although a configuration in which optical terminator 25 is provided at the stage after the alternative output terminal of optical switch 20d at the last stage in serial-parallel converter SP is shown, the signals can be output to an optical fiber not shown in the drawing without providing the optical terminator. For example, with a 40 Gbps optical TDM signal in which sixteen 2.5 Gbps optical signals are multiplexed, only four optical signals may be acquired by serial-parallel converter SP and an optical TDM signal in which the remaining twelve optical signals are multiplexed may be output to an optical fiber not shown in the drawing.

(4) In the systems shown in FIG. 3 and FIG. 5, although an example in which an optical TDM signal with a transmission speed of 40 Gbps is time-demultiplexed is used, the transmission speed may be set to an alternative one.

(5) In the systems shown in FIG. 3 and FIG. 5, a configuration in which four optical switches 20a to 20d are cascaded in serial-parallel converter SP is shown, however, the number of optical switches to be provided may be as few as two. Of course, the same number of receiving parts 22a to 22d and drivers 24a to 24d are to be provided as the number of optical switches.

(6) In the systems shown in FIG. 3 and FIG. 5, although a configuration is shown in which an optical TDM signal wherein a plurality of optical signals is optically time-division multiplexed is subjected to time-demultiplexing, a time-serial pulse train optical signal may also be subjected to time-demultiplexing.

(7) In the system shown in FIG. 3, although a configuration in which clock extracting part 23 extracts the clock signal from electrical signals output from receiving part 22a is shown, the clock signal may be extracted from electrical signals output from any of receiving parts 22b to 22d separate from receiving part 22a.

(8) In the system shown in FIG. 5, although a configuration in which receiving part 27 integrates optical power during the interval equivalent to four periods, optical power can be integrated during the interval equivalent to periods whose number is more than the number of optical switches 20a to 20d provided in serial-parallel converter SP.

According to the present invention, there are the following effects:

A serial pulse train optical signal with transmission speed N is time-demultiplexed to optical signals each with transmission speed M reduced from the transmission speed N by dividing the original transmission speed by the number of cascaded optical switches. Optical signals with transmission speed M are converted to electrical signals by the receiving parts. Or the second receiving part outputs electrical signals corresponding to the optical power of the optical signal of transmission speed N. Further, the synchronizing circuit and drivers operate in synchronization with the electrical signals from the receiving parts or the second receiving part. This enables a lower-speed electrical signal to perform time-demultiplexing of a higher-speed optical signal and to convert it to electrical signals.

Since the optical terminator carries out termination processing of the optical signal output from the alternative output terminal of the last stage optical switch in the serial-parallel converter, return light to the serial-parallel converter can be suppressed.

Since each optical signal is simultaneously input to each corresponding optical switch through delay lines, timing signals to the drivers can be output simultaneously. This makes timing adjustment for switching optical switch connections easy.

What is claimed is:

1. An optical signal processing system to convert a serial pulse train optical signal with transmission speed N to parallel pulse train electrical signals comprising:

a serial-parallel converter in which at least two cascaded optical switches are provided, each of which includes an input terminal and two output terminals and receives said serial pulse train optical signal as an input to the input terminal and outputs a pulse train optical signal with transmission speed M equal to a value obtained by dividing the transmission speed N by an integer to one of the two output terminals and outputs pulse train optical signals to an alternative one of said two output terminals by switching a connection to said output terminals, a plurality of receiving parts which are provided respectively for each optical switch located in said serial-parallel converter and convert the optical signals from one of two output terminals of each of said optical switches to electrical signals, a synchronizing circuit which extracts clock signals from electrical signals output from one of said plurality of receiving parts and outputs timing signals in synchronization with these clock signals, and drivers which are provided for each of said optical switches located in said serial-parallel converter and cause said optical switches to switch their connections based on timing signals output from said synchronizing circuit.

2. An optical signal processing system in accordance with claim 1, wherein an optical terminator is provided, which carries out termination processing of optical signals output from the alternative one of two output terminals of a last stage optical switch located in said serial-parallel converter.

3. An optical signal processing system to convert a serial pulse train optical signal with transmission speed N to parallel pulse train electrical signals comprising:

a serial-parallel converter in which at least two cascaded optical switches are provided, each of which includes an input terminal and two output terminals and receives said serial pulse train optical signal as an input to each input terminal and outputs a pulse train optical signal with transmission speed M equal to a value obtained by dividing the transmission speed of N by an integer to one of the two output terminals and outputs pulse train optical signals to an alternative one of said two output terminals by switching a connection to said output terminals, receiving parts which are provided for each optical switch located in said serial-parallel converter and convert the optical signals from one of the two output terminals of each of said optical switches to electrical signals, a second receiving part which outputs electrical signals corresponding to an optical power of optical signals output from the alternative one of said two output terminals of a last stage optical switch located in said serial-parallel converter, a synchronizing circuit which outputs timing signals based on electrical signals output from said second receiving part, and drivers which are provided for each of optical switches located in said serial-parallel converter and cause said optical switches to switch their connections based on timing signals output from said synchronizing circuit.

4. An optical signal processing system in accordance with claim 3, wherein said second receiving part integrates the optical power of optical signals during at least an interval equivalent to periods of said serial pulse train optical signal, a number of the periods being equal to the number of optical switches provided in said serial-parallel converter.

5. An optical signal processing system in accordance with any of claims 1 to 4, wherein said serial pulse train optical signal with transmission speed N is an optical time division multiplexing signal.

6. An optical signal processing system in accordance with any of claims 1 to 4, wherein delay lines, each of which delays said pulse train optical signal with transmission speed N by an interval equivalent to its one period, are provided between optical switches located in said serial-parallel converter.

7. An optical signal processing system in accordance with any of claims 1 to 4, wherein a data regenerating part is provided which changes at least either a modulation scheme or pulse width of electrical signals received by said receiving parts using timing signals from said synchronizing circuit, and outputs the resulting electrical signals.

8. An optical signal processing system in accordance with any of claims 1 to 4, wherein said drivers cause connection of said optical switches to be made to one of two output terminals of each of said optical switches for at most one period of said serial pulse train optical signal with transmission speed N when timing signals are input from said synchronizing circuit.

* * * * *